United States Patent

[11] 3,619,479

| [72] | Inventor | Gunther Bogner<br>Tennenlohe, Germany |
|---|---|---|
| [21] | Appl. No. | 46,997 |
| [22] | Filed | June 17, 1970 |
| [45] | Patented | Nov. 9, 1971 |
| [73] | Assignee | Siemens Aktiengesellschaft<br>Berlin, Germany |
| [32] | Priority | June 25, 1969 |
| [33] | | Germany |
| [31] | | P 19 32 086.6 |

[54] ELECTRICAL CONDUCTOR OF ELECTRICALLY NORMAL CONDUCTING METAL AND SUPERCONDUCTING MATERIAL
16 Claims, 8 Drawing Figs.

[52] U.S. Cl. .................................................... 174/126,
174/15 C, 174/DIG. 6, 335/216
[51] Int. Cl. ............................................... H01b 5/00,
H01b 7/34
[50] Field of Search ............................................ 174/DIG. 6,
15 C, 126, 128, 133, 130, 129; 335/216

[56] References Cited
UNITED STATES PATENTS
3,306,972  2/1967  Laverick et al. ............... 174/126

| 3,472,944 | 10/1969 | Morton et al. | 174/128 X |
| 3,502,789 | 3/1970 | Barber et al. | 174/128 |
| 3,527,873 | 9/1970 | Brechna et al. | 174/15 |
| 3,550,050 | 12/1970 | Albrecht | 174/128 |

FOREIGN PATENTS

| 284,774 | 2/1928 | Great Britain | 174/15 C |
| 877,012 | 5/1953 | Germany | 174/15 C |

Primary Examiner—Lewis H. Myers
Assistant Examiner—A. T. Grimley
Attorneys—Curt M. Avery, Arthur E. Wilfond, Herbert L. Lerner and Daniel J. Tick ABSTRACT: A tubular conductor of electrically normal conducting metal has an outside rectangular configuration having a plurality of external surfaces. A tape-shaped conductor affixed to the tubular conductor at an external surface thereof comprises electrically normal conducting metal and wires of superconducting material embedded in the normal conducting metal and twisted about the longitudinal axis of the tape-shaped conductor. The tubular conductor is electrically normal conducting at the operating temperature at the superconducting material.

PATENTED NOV 9 1971 3,619,479

ELECTRICAL CONDUCTOR OF ELECTRICALLY NORMAL CONDUCTING METAL AND SUPERCONDUCTING MATERIAL

DESCRIPTION OF THE INVENTION

The invention relates to an electrical conductor of electrically normal conducting metal and superconducting material. More particularly, the invention relates to a tubular conductor of electrically normal conducting metal having a tape-shaped conductor having wires of superconducting material embedded therein affixed to a surface of the tubular conductor. The tubular conductor is electrically normal conducting at the operating temperature of the superconducting material.

The windings of large superconducting magnets utilizing tubular conductors comprising electrically normal conducting metal at the operating temperature of the superconducting material provide special advantages. A tubular conductor has a hollow space formed within it and cooling fluid or coolant flows through the hollow space to provide the low temperatures required for the superconducting condition. Fluid or cold gaseous helium may be pumped through the hollow space of the tubular conductor, so that in a superconductor magnet winding of tubular conductors the helium cryostat usually required for cooling the winding of the superconducting magnet winding may be eliminated and replaced by a simple vacuum chamber around the winding. The vacuum chamber thermally insulates the winding from the outside.

Furthermore, in a magnet winding of hollow conductors, the quantity of the coolant in the magnetic system may be considerably reduced in relation to the coolant fluid required for cooling a magnet of equal size in a bath. This is particularly important, because, upon the transformation of the magnet winding from a superconducting condition to a normal conducting condition, less fluid coolant may evaporate. Furthermore, only magnet windings having hollow conductors may be spatially oriented as desired, whereas magnet windings cooled in a bath may not. The magnet windings having hollow conductors may also be varied in position during operation.

Copper tubular conductors have been developed of square cross section. Superconducting niobium-tin bands are soldered in two slots formed in adjacent opposite surfaces of the copper tube. Afterward, tubular copper conductors of rectangular cross section were developed having a plurality of superconducting niobium-titanium wires embedded in a wall of the tube. The superconductors were thus distributed over the entire wall section around the central hollow space of the tubular conductor. A relevant article by H. Brechna appears in "Proceedings Of The 1968 Summer Study On Superconducting Devices And Accelerators," Brookhaven National Laboratory BNL 50 155 (C–55), 1969, Part II, pages 478 to 510. The tubular conductors are produced by common extrusion of copper and niobium-titanium wires.

Due to the considerable quantities of electrically normal conducting metal utilized, the tubular conductors of copper and niobium-titanium wires may be produced only in relatively short lengths, particularly when conductors with larger cross sections are required. In order to provide the longer lengths, of possibly several kilometers required for larger magnet windings, a plurality of conductor sections must be joined and bonded together. The connections between the various conductor sections must not markedly reduce the electrical properties, so that such connections must have the lowest contact resistance at their electrical contacts. Furthermore, the connections between the various conductor sections must maintain a high vacuum tight seal of the hollow space within the tubular conductor.

Since the coolant must normally be pumped through the tubular conductor, the connections between the various conductor sections must be capable of withstanding an increased coolant pressure. At a temperature of 4.25° K., the connections between the conductor sections must be high vacuum tight for fluid helium at a very high pressure of, for example, 20 atmospheres. The requirements for electrical contact having a minimum contact resistance and a high vacuum tight junction at high pressures are very difficult to satisfy simultaneously. An additional disadvantage of tubular conductors having large cross sections is that in the extrusion process, the superconducting wires may be only slightly deformed, so that their cross section in the completed conductor is relatively large. This results in considerable magnetic instabilities and low critical current intensity.

The anisotropic effect may occur in case of noncircular cross sections of the superconducting wires. This means that the critical current intensity of the superconducting wires is dependent upon the spatial position of the superconductors in the local magnetic field produced by the magnet winding. The anisotropic effect may be considerably disturbing to the operation of the magnet winding. This is also true for tubular conductors having niobium-tin bands, as hereinbefore described.

The invention modifies a tubular conductor of electrically normal conducting metal having superconducting material affixed to an outside surface thereof, which metal is electrically normal conducting at the operating temperature of the superconducting material, to overcome the aforedescribed disadvantages.

The principal object of the invention is to provide a new and improved electrical conductor of electrically normal conducting metal and superconducting material.

An object of the invention is to provide an electrical conductor of electrically normal conducting metal and superconducting material which overcomes the disadvantages of known similar types of electrical conductor.

An object of the invention is to provide an electrical conductor of electrically normal conducting metal and superconducting material of which the tube through which the coolant flows and the tape-shaped conductor having the superconducting wires embedded therein may be produced completely independently from each other and may be assembled from single sections to provide a conductor of considerable length, as desired.

An object of the invention is to provide an electrical conductor of electrically normal conducting metal and superconducting material which functions with efficiency, effectiveness and reliability.

In accordance with the present invention, an electrical conductor comprises a tubular conductor of electrically normal conducting metal having an outside rectangular configuration having a plurality of external surfaces. A tape-shaped conductor affixed to the tubular conductor at an external surface thereof comprises electrically normal conducting metal and wires of superconducting material embedded in the normal conducting metal and twisted about the longitudinal axis of the tape-shaped conductor. The tubular conductor is electrically normal conducting at the operating temperature of the superconducting material.

The tape-shaped conductor comprises copper or aluminum having wires of high field superconducting material embedded therein. The tape-shaped conductor comprises copper and aluminum having wires including niobium-titanium embedded therein. The tubular conductor comprises copper or aluminum.

An additional tape-shaped conductor comprising material of greater tensile strength than the material of the tubular conductor is affixed to an external surface of the tubular conductor. The tubular conductor comprises material of great tensile strength. The tubular conductor and the tape-shaped conductor are soldered or welded to each other.

The tape-shaped conductor comprises a plurality of adjacent component conductors of electrically normal conducting metal having wires of superconducting material embedded therein. Each of the component conductors of the tape-shaped conductor is shaped as a cross-rod. The component conductors of the tape-shaped conductor are electrically insulated from each other and from the tubular conductor. The tape-shaped conductor comprises electrically normal conducting high ohmic metal. An auxiliary frame is affixed to the tubular conductor and the component conductors of the tape-shaped conductor are embedded in the auxiliary frame. The tubular conductor and the tape-shaped conductor are soldered to each other.

The tubular conductor comprises a plurality of longitudinally extending sections affixed to each other and the tape-shaped conductor comprises a plurality of longitudinally extending sections affixed to each other. The sections of the tape-shaped conductor ore longer than the sections of the tubular conductor. The points at which the sections of the tape-shaped conductor are joined are staggered from the points at which the sections of the tubular conductor are joined.

Since the tubular conductor and the tape-shaped conductor may be produced independently from each other, and may be assembled from individual sections to desired lengths, the individual sections of said tubular conductor and the individual sections of said tape-shaped conductor may be joined to each other independently, so that they may provide maximum satisfaction of the specific requirements. After the individual sections of the tubular conductor have been joined to each other and after the individual sections of the tape-shaped conductor have been joined to each other, the tape-shaped conductor may be affixed to an external surface of the tubular conductor.

Since the superconducting wires in the tape-shaped conductor are twisted about the longitudinal axis thereof, the shielding currents produced by the energization of windings of tubular conductors having untwisted superconductors may be avoided. These shielding currents decay only after a long period of time and cause long term variations of the magnetic field of the winding and increased losses in the conductor. Such twisting of the superconducting wires in an ordinary tubular conductor is not practically attainable.

Copper is particularly well suited as the electrically normal conducting metal of the tape-shaped conductor. If the electrically normal conducting metal need not have as great mechanical strength, aluminum may be utilized therefor. Niobium-titanium alloy or alloys having multiple components with a niobium-titanium base are particularly suitable as the superconducting material. Furthermore, other high field superconducting materials, which may be worked into thin wires, are suitable as the superconducting wires of the tape-shaped conductor.

The tubular conductor preferably has a rectangular cross section and preferably comprises copper, but may comprise aluminum when the requirement for mechanical strength is not as great. When a tubular conductor is exposed to very high tensile strength due to magnetic forces in the magnet winding, it may be of advantage to provide at least an additional tape-shaped conductor of a material having a higher tensile strength than the metal of the tubular conductor. The additional tape-shaped conductor is affixed to a surface of the tubular conductor. The additional tape-shaped conductor preferably comprises nonmagnetic steel or a copper-beryllium alloy.

If the tubular conductor is required to have considerable mechanical strength, said tubular conductor may comprise material having high tensile strength such as, for example, nonmagnetic steel or a copper-beryllium alloy.

The tape-shaped conductor may comprise a plurality of adjacent component conductors of electrically normal conducting metal having embedded wires of superconducting material. The component conductors of the tape-shaped conductor may be twisted with each other in the shape of a cross-rod in order to avoid eddy currents. The twisted component conductors of a cross-rod may be in metallic contact with each other. In order to avoid eddy currents, however, the component conductors of a cross-rod must be electrically insulated from one another and from the tubular conductor. An auxiliary frame is affixed to an external surface of the tubular conductor and the component conductors, in mutually insulated relation, and insulated from the tubular conductor, are embedded in the auxiliary frame.

A copper-nickel alloy or other high ohmic metal may be utilized as the electrically normal conducting metal of the tape-shaped conductor when said conductor is utilized in an AC application, in order to further reduce eddy current losses. The tape-shaped conductor may comprise mutually insulated component conductors affixed to a tubular conductor comprising poor electrically conducting material of great tensile strength.

The tubular conductor and the tape-shaped conductor may be soldered to each other. Suitable solders are indium, tin-silver and lead-tin alloys. Ultrasonic soldering may be provided when the electrically normal conducting metal comprises aluminum. The tape-shaped conductor and the tubular conductor may be welded to each other. Suitable welding apparatus for this purpose is electron beam or cathode ray welding apparatus.

A tape-shaped conductor containing less electrically normal conducting metal may be produced in longer sections than the tubular conductor, since the length of the tubular conductor and the tape-shaped conductor produced in a single operation depends upon the quantity of the material to be worked. The electrical contact points between the sections of the tape-shaped conductor and the fluid tight connections between the sections of the tubular conductor may therefore be separated from each other in a manner whereby the contact points between the sections of the tape-shaped conductor are mutually farther apart than the contact points between the sections of the tubular conductor. Furthermore, the contact points of the tubular conductor and the contact points of the tape-shaped conductor may be staggered relative to each other in order to permit the contact points of the tape-shaped conductor sections to be electrically bridged by the tubular conductor.

In order that the invention may be readily carried into effect, it will now be described with reference to the accompanying drawing, wherein:

FIG. 1b is a schematic longitudinal sectional diagram of the embodiment of FIG. 1a;

FIG. 4b is a schematic diagram illustrating the positioning of the component conductors of the embodiment of FIG. 4a.

Figure 1A:
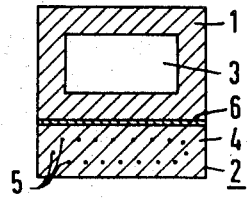
FIG. 1a is a schematic cross-sectional diagram of an embodiment of the electrical conductor of the invention.
Figure 1B:
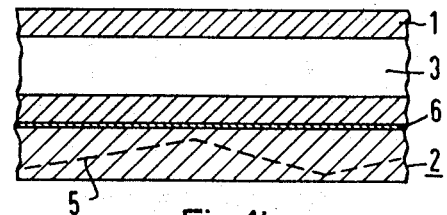
Figure 1C:
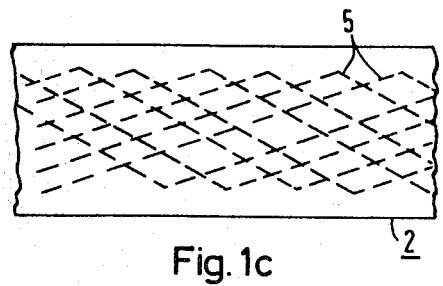
FIG. 1c is a schematic bottom view of the embodiment of FIGS. 1a and 1b.

The electrical conductor of the embodiment of FIGS. 1a, 1b and 1c is especially suitable for use as a DC magnet winding. The electrical conductor comprises a tubular conductor 1 of rectangular cross section and a tape-shaped conductor 2 affixed to an external surface of said tubular conductor. The tubular conductor 1 forms a hollow space 3 of rectangular cross-sectional area through which the coolant flows.

The tape-shaped conductor 2 comprises a copper body 4 having a plurality of thin wire-shaped superconductors 5 embedded therein. The superconducting wires 5 comprise a niobium-titanium alloy. The superconducting wires 5 are twisted about the longitudinal axis of the tape-shaped conductor 2. This is clearly shown in FIGS. 1b and 1c, wherein the broken lines illustrate the path of one of the superconducting wires 5.

A plurality of copper rods and niobium-titanium wires may first be shaped into a conductor by drawing and rolling processes. This results in a fusion of the surfaces of the superconducting wires with the surrounding copper, so that good electrical contact is established. The complete conductor is then twisted about its longitudinal axis and is further shaped by additional drawing and rolling processes into a form having a rectangular cross-sectional area of smaller dimensions.

The tape-shaped conductor 2 is affixed to an external surface of the copper tubular conductor 1 in good thermal and electrical contact. The tape-shaped conductor 2 and the tubular conductor 1 may be affixed to each other by any suitable means such as, for example, a solder 6 comprising a lead-tin alloy.

The embodiment of the electrical conductor of FIGS. 1a to 1c is particularly well suited for fully stabilized conductors, in which, in the event of a partial or total transition of the superconducting wires 5 from the superconducting condition to the electrically normal conducting condition, the copper body 4 and the tubular conductor 1 may accommodate all the current flowing through the conductor without increasing the temperature of the conductor above the critical temperature of the superconducting material of said superconducting wires, when the conductor is suitably cooled. In such a fully stabilized conductor, the cross section of the copper tubular conductor 1 and of the tape-shaped conductor 2 is so dimensioned that the entire tubular conductor satisfies the formula $\rho j^2\ h\Delta T\ S\ F^{11}$ wherein $\rho$ is the specific resistance of the copper in ohm-cm., $j$ is the maximum permissible current density in amperes per cm.$^2$, $h$ is the coefficient of heat transfer between the conductor and the coolant in W per cm.$^{2\circ}$ K., $\Delta T$ is the temperature increase in the conductor in °K. upon the transfer of the current having a current density $j$ from the superconducting material to the electrically normal conducting metal, S is the contour of the conductor in cm. wetted by the coolant and F is the entire copper cross section of the conductor in cm$^2$.

A conductor of the aforedescribed type should, for example, have a current conducting capacity of 6000 amperes in a magnetic field of 50 kilogauss at 4.5° K., and may comprise, for example, a copper tube 1 having a complete cross-sectional area of 15 by 10 mm.$^2$ and a wall thickness of 2 mm., and a tape-shaped conductor 2 having a cross-sectional area of 15 by 5 mm$^2$. The tape-shaped conductor 2 includes 200 superconducting wires 5 of a niobium-titanium alloy embedded therein. The diameter of a single superconducting wire 5 may be 0.2 mm. The superconducting wires 5 may be twisted in a manner whereby they are positioned at the same spot within the tape-shaped conductor 2 at intervals of 1 meter.

Figure 2:
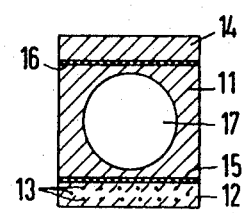
FIG. 2 is a schematic cross-sectional diagram of another embodiment of the electrical conductor of the invention.

The tubular conductor 1 may be modified in a manner whereby an additional tape-shaped conductor 14 may be affixed to an external surface thereof, as shown in FIG. 2. The additional tape-shaped conductor 14 is affixed to an external surface of the tubular conductor 11 opposite the tape-shaped conductor 12. The embodiment of FIG. 2 may be utilized when it is necessary to provide additional protection of the tubular conductor 11 from magnetic forces.

In the embodiment of FIG. 2, the tape-shaped conductor 12 is affixed to an external surface of the copper tubular conductor 11. The tape-shaped conductor 12 comprises a copper body having a plurality of superconducting wires 13 embedded therein and twisted about the longitudinal axis of said tape-shaped conductor. The additional tape-shaped conductor 14 is affixed to an external surface of the tubular conductor 11 opposite that to which the tape-shaped conductor 12 is affixed.

The additional tape-shaped conductor 14 comprises material having a greater tensile strength than copper. The additional tape-shaped conductor 14 may comprise, for example, nonmagnetic steel or a copper-beryllium alloy. The tape-shaped conductor 12 is affixed to the tubular conductor 11 via a solder layer 15 and the additional tape-shaped conductor 14 is affixed to said tubular conductor via a solder layer 16. The tubular conductor 11 forms a hollow space 17 therewithin. The hollow space 17 of the tubular conductor 11 has a circular cross section. The circular cross section of the inside of the tubular conductor 11 may be more suitable as a rectangular cross section, in order to provide a greater tensile strength of said tubular conductor and to provide better flow conditions for the coolant.

Figure 3:
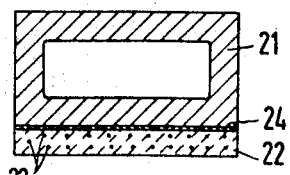
FIG. 3 is a schematic cross-sectional diagram of another embodiment of the electrical conductor of the invention.

As shown in FIG. 3, the mechanical strength of the electrical conductor may be additionally increased by providing a tubular conductor 21 of great tensile strength such as, for example, nonmagnetic steel or a beryllium-copper alloy. In FIG. 3, a tape-shaped conductor 22 having superconducting wires 23 embedded therein and twisted about the longitudinal axis of said tape-shaped conductor is affixed to an external surface of the tubular conductor 21 via a solder layer 24.

The geometric configuration of the conductor may thus be advantageously selected in a manner whereby, at the minimum winding radius of the magnet winding, the tape-shaped conductor 22 after winding is subjected to an elastic pressure force, the conductor 22 being positioned at the inside of the winding. The pressure force is compensated by the magnetic forces produced upon energization of the magnet, so that the tape-shaped conductor 22 remains free of forces during the operation. In the embodiment of FIG. 2, however, the tubular conductor 21 cannot completely provide the electrical stabilization, due to the high ohmic resistance of its great tensile strength material.

Figure 4A:
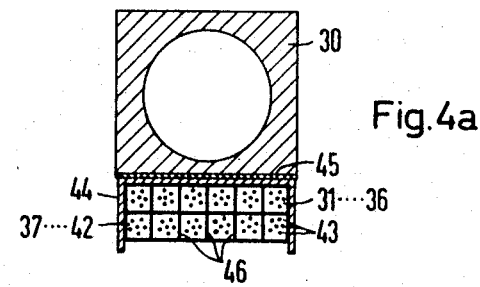
FIG. 4a is a schematic cross-sectional diagram of another embodiment of the electrical conductor of the invention.

In the embodiment of FIG. 4a, the tape-shaped conductor comprises a plurality of adjacent component conductors 31 to 42 and the tape-shaped conductor is affixed to an external surface of the tubular conductor 30. The component conductors 31 to 42 are positioned in two layers, one above the other, comprising copper, and have a plurality of niobium-titanium wires 43 embedded therein.

The diameter of each superconducting wire 43 is preferably less than 0.1 mm., since wires of such small cross-sectional area are self stable. In such self stable wires transitions from superconducting condition to electrically normal conducting condition due to magnetic flux jumps do not appear below the maximum permissible current load. The relationship between the cross sections of the electrically normal conducting metal and the superconducting material in the component conductors 31 to 42 may therefore be 1:1 as a minimum.

Figure 4B:
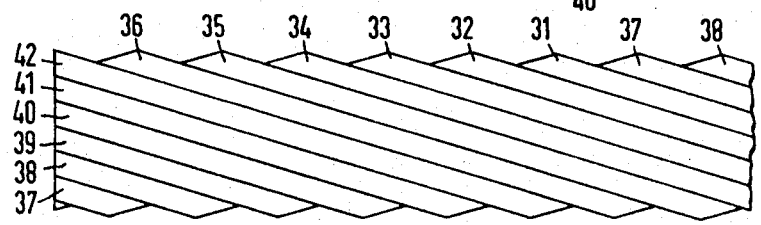

The component conductors 31 to 42 are positioned in strands shaped as cross-rods or Roebel rods in order to avoid eddy currents. A cross-rod is shown in FIG. 4b. As clearly shown in FIG. 4b, the component conductors 31 to 36 and the component conductors 37 to 42 are alternately positioned by crossing into one of the two layers of the tape-shaped conductor. The component conductors 31 to 42 are embedded in an auxiliary frame 44 affixed to an external surface of the tubular conductor 30. The auxiliary frame 44 comprises good heat conducting metal and may be affixed to the tubular conductor 30 by a solder layer 45.

The component conductors 31 to 42 are electrically insulated from each other and from the auxiliary frame 44 by layers 46 of varnish. The component conductors 31 to 42 are thus electrically insulated from the tubular conductor 30. The tubular conductor 30 may comprise copper or a metal of great tensile strength having poorer conducting characteristics.

If in each component conductor of the embodiment FIG. 4a, the superconducting wires 43 are twisted about the longitudinal axis of the component conductor, the various component conductors 31 to 42 may also be positioned in parallel relation to each other. When the component conductors are positioned in crosswise relation, there need be no insulation for the individual component conductors. In such case, the component conductors may be soldered directly to the tubular conductor 30 without the use of the auxiliary frame 44. When the tubular conductor 30 comprises electrically normal conducting metal such as, for example, copper or aluminum, the entire conductor is fully stabilized and the superconductor is self stabilized.

A conductor of the type of FIGS. 4a and 4b may be utilized for AC applications in order to further reduce AC losses. The electrically normal conducting metal body of the component conductors 31 to 42 then comprises a metal of higher ohmic resistance than copper. The component conductors thus preferably comprise a copper-nickel alloy. In such an embodiment, the tubular conductor 30 comprises a metal of poor electrical conductivity but great tensile strength.

Figure 5:
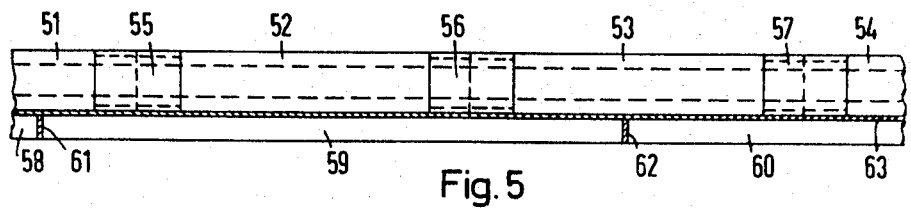
FIG. 5 is a schematic diagram of an electrical conductor of the invention comprising a plurality of sections.

In the embodiment of FIG. 5, each of the tubular conductor and the tape-shaped conductor comprises a plurality of short length sections. The tubular conductor comprises a plurality of copper tubular sections 51, 52, 53 and 54 which are affixed to each other by copper sleeves 55, 56 and 57 at the ends of said tubular sections. The ends of the tubular sections 51, 52, 53 and 54 are provided with reduced outer diameters, to accommodate the connecting copper sleeves 55, 56 and 57. The sleeves 55, 56 and 57 may be hard-soldered to the tubular sections 51, 52, 53 and 54 in order to provide fluidtight connections. This permits a tubular conductor of any desired length to be provided independently of the production of the superconductors.

In the embodiment of FIG. 5, the tape-shaped conductor comprises a plurality of short length sections 58, 59 and 60. The component sections of the tape-shaped conductor may be suitably joined to each other at contact points 61 and 62 by cold press butt welding, independently of the production of the tubular conductor. The coolant density of the tubular conductor need not be considered at the joints of the component sections 58, 59 and 60. Only the desired low transfer resistance need be considered.

The completed tubular conductor and the completed tape-shaped conductor are soldered to each other in a final operation via a solder layer 63. Since the tape-shaped conductor may thus be produced in considerably longer component sections than the tubular conductor, the contact points 61 and 62 of said component sections may be spaced farther apart than the coupling sleeves 55, 56 and 57 of said tubular conductor. Thus, the electrical transfer resistance at the contact points of the component sections of the tape-shaped conductor, due to the smaller number of contact points, may be kept smaller than at the contact points of the component sections of the tubular conductor of known type in which the superconductors are embedded in a wall of said tubular conductor. Furthermore, the contact points 61 and 62 of the component sections of the tape-shaped conductor and the contacts 55, 56 and 57 of the component sections of the tubular conductor are staggered relative to each other.

The solder layer 63 preferably comprises a solder having a melting temperature which is higher than that of solders utilized for other contacts in a magnetic winding wound on a tubular conductor.

The tape-shaped conductor may be affixed to the tubular conductor by electron beam or cathode ray welding. This joining system is particularly well suited for conductors of smaller cross-sectional areas which need be heated for only a brief period of time in a welding operation. During heating, special emphasis must be given the fact that the superconducting properties of the superconducting wires embedded in the tape-shaped conductor should be provided maximum protection from impairment.

While the invention has been described by means of specific examples and in specific embodiments, I do not wish to be limited thereto, for obvious modifications will occur to those skilled in the art without departing from the spirit and scope of the invention.

I claim:

1. An electrical conductor comprising
a tubular conductor of electrically normal conducting metal having an outside rectangular configuration having a plurality of external surfaces; and
a tape-shaped conductor affixed to said tubular conductor at an external surface thereof, said tape-shaped conductor comprising electrically normal conducting metal and wires of superconducting material embedded in said normal conducting metal and twisted about the longitudinal axis of said tape-shaped conductor, said tubular conductor being electrically normal conducting at the operating temperature of the superconducting material.

2. An electrical conductor as claimed in claim 1, wherein said tape-shaped conductor comprises one of copper and aluminum having wires of high field superconducting material embedded therein.

3. An electrical conductor as claimed in claim 1, wherein said tape-shaped conductor comprises one of copper and aluminum having wires including niobium-titanium embedded therein.

4. An electrical conductor as claimed in claim 1, wherein said tubular conductor comprises one of copper and aluminum.

5. An electrical conductor as claimed in claim 1, further comprising a tape-shaped conductor comprising material of greater tensile strength than the material of said tubular conductor, said tape-shaped conductor being affixed to an external surface of said tubular conductor.

6. An electrical conductor as claimed in claim 1, wherein said tubular conductor comprises material of great tensile strength.

7. An electrical conductor as claimed in claim 1, wherein said tubular conductor and said tape-shaped conductor are soldered to each other.

8. An electrical conductor as claimed in claim 1, wherein said tubular conductor and said tape-shaped conductor are welded to each other.

9. An electrical conductor as claimed in claim 1, wherein said tubular conductor comprises a plurality of longitudinally extending sections affixed to each other and said tape-shaped conductor comprises a plurality of longitudinally extending sections affixed to each other, the sections of said tape-shaped conductor being longer than the sections of said tubular conductor.

10. An electrical conductor as claimed in claim 1, wherein said tape-shaped conductor comprises a plurality of adjacent component conductors of electrically normal conducting metal having wires of superconducting material embedded therein.

11. An electrical conductor as claimed in claim 9, wherein the points at which the sections of the tape-shaped conductor are joined are staggered from the points at which the sections of the tubular conductor are joined.

12. An electrical conductor as claimed in claim 10, wherein each of the component conductors of said tape-shaped conductor is shaped as a cross-rod.

13. An electrical conductor as claimed in claim 10, wherein the component conductors of said tape-shaped conductor are electrically insulated from each other and from said tubular conductor.

14. An electrical conductor as claimed in claim 10, wherein said tape-shaped conductor comprises electrically normal conducting high ohmic metal.

15. An electrical conductor as claimed in claim 13, further comprising an auxiliary frame affixed to said tubular conductor, the component conductors of said tape-shaped conductor being imbedded in said auxiliary frame.

16. An electrical conductor as claimed in claim 14, wherein said tubular conductor and said tape-shaped conductor are soldered to each other.

* * * * *